(12) United States Patent
Hitzl

(10) Patent No.: US 8,475,727 B2
(45) Date of Patent: Jul. 2, 2013

(54) PRESSURE AND TEMPERATURE CONTROL SYSTEM FOR AT LEAST ONE CHEMICAL REACTOR

(75) Inventor: Martin Hitzl, Valencia (ES)

(73) Assignee: Ingelia, S.L., Valencia (ES)

(*) Notice: Subject to any disclaimer, the term of this patent is extended or adjusted under 35 U.S.C. 154(b) by 0 days.

(21) Appl. No.: 13/081,555

(22) Filed: Apr. 7, 2011

(65) Prior Publication Data
US 2011/0225876 A1 Sep. 22, 2011

Related U.S. Application Data

(63) Continuation of application No. PCT/ES2009/070502, filed on Nov. 16, 2009.

(30) Foreign Application Priority Data

Nov. 17, 2008 (ES) .................................. 200803271
Nov. 17, 2008 (ES) .................................. 200803272

(51) Int. Cl.
*F28D 21/00* (2006.01)
*B01J 19/00* (2006.01)
*B01J 8/00* (2006.01)
*C10L 1/00* (2006.01)
*C10L 1/10* (2006.01)

(52) U.S. Cl.
USPC ........... 422/208; 422/129; 422/187; 422/198; 44/300; 44/307

(58) Field of Classification Search
USPC ............ 422/119, 129, 198, 208, 187; 44/300, 44/307
See application file for complete search history.

(56) References Cited

U.S. PATENT DOCUMENTS

| | | | |
|---|---|---|---|
| 2,595,365 A * | 5/1952 | Odell et al. .................... | 502/419 |
| 2,974,130 A | 3/1961 | Moberly | |
| 4,278,447 A * | 7/1981 | Dudt .............................. | 48/210 |
| 4,579,562 A | 4/1986 | Tarman et al. | |
| 4,863,586 A * | 9/1989 | Wenning ........................ | 208/102 |
| 2008/0196306 A1* | 8/2008 | van der Meijden et al. .... | 48/111 |
| 2010/0162619 A1* | 7/2010 | Peus .............................. | 44/605 |

FOREIGN PATENT DOCUMENTS

| | | |
|---|---|---|
| DE | 10 2006 038 983 | 2/2008 |
| DE | 10 2007 062 808 | 7/2008 |
| EP | 1 970 431 | 9/2008 |
| ES | 160612 | 2/1943 |
| WO | 02/06153 | 1/2002 |
| WO | 2008/095589 | 8/2008 |

OTHER PUBLICATIONS

MPI Publication "Magic Coal from the Steam Cooker", Mar. 2006, MaxPlanckResearch, pp. 20-25.*
International Search Report issued Feb. 25, 2010 in International (PCT) Application No. PCT/ES2009/070502.
M. Titirici et al., "Back in the black: hydrothermal carbonization of plant material as an efficient chemical process to treat the $CO_2$ problem?", 2007, New Journal of Chemistry, pp. 787-789.

* cited by examiner

*Primary Examiner* — Jill Warden
*Assistant Examiner* — Natasha Young
(74) *Attorney, Agent, or Firm* — Wenderoth, Lind & Ponack, L.L.P.

(57) ABSTRACT

This invention relates to a new system for controlling temperature and pressure in, at least, one chemical reactor, characterized in that it includes, at least, the following devices: a) a deposit with at least one pressure regulation device; b) a connecting duct between said deposit and the reactor; c) a device for injecting condensates into the reactor. Moreover, the invention relates to the use of said control system to control the pressure and temperature of at least one chemical reactor, being especially applicable to a chemical reactor in which a hydrothermal biomass carbonization reaction takes place.

17 Claims, 2 Drawing Sheets

PRESSURE AND TEMPERATURE CONTROL SYSTEM FOR AT LEAST ONE CHEMICAL REACTOR

This application is a continuation application of International Application PCT/ES2009/070502, filed Nov. 16, 2009, the subject matter of which is herein incorporated by reference in its entirety.

TECHNICAL FIELD

The scope of the present invention is a new pressure and temperature control system for a reactor or a set of chemical reactors containing an aqueous solution at a temperature close to its evaporation temperature under the process pressure therein. Said control system is primarily based on a set of equipments on which the actual process water is used for the temperature refrigeration and stabilization throughout the reactor or set of reactors of the system.

Likewise, a preferred embodiment of this invention is directed to the hydrothermal carbonization process, hereinafter HTC process (English, Hydrothermal Carbonization).

STATE OF THE ART PRIOR TO THE INVENTION

In recent years, due to the growing need to meet energy demand in industrialized countries, numerous studies aimed at promoting new renewable nature, energy sources have been developed, in order to reduce adverse environmental impacts associated with the continuous industrial development.

Amongst these sources of energy, one of the most studied has been,. without doubt, the biomass. In general, biomass is defined as the biodegradable organic fraction existing in products from various sources such as, for example, municipal waste or derivatives from agricultural and forestry industries. Among the main alternatives that exist for energy use, there can be mentioned its use as a starting material for the production of transportation fuels, as well its use as a source of heat and electricity.

While there have been many technologies developed in this field in recent years, most recently the team of Professor Markus Antonietti from Max Planck Institute has presented a high-efficiency new method of using biomass, based on the hydrothermal carbonization thereof (Elton Jacquot, J., "Back in Black: Using hydrothermal Carbonization to clean Emissions", 2007, Science & Technology). This HTC process basically consists in subjecting an aqueous solution of biomass in the presence of a catalyst at temperatures from 180° C. to 210° C. and at pressures from 10 to 19 bar obtaining, after 4 to 24 h, a product similar to coal structure. Once activated, it is a spontaneous and exothermic process that releases, taking advantage of the high thermodynamic stability of water, up to one third of the energy stored in biomass in the form of carbohydrates.

Its main advantage over other methods previously described in the literature, is its great simplicity. Unlike other processes of carbonization, in which it is necessary to carry out a high energy consumption step for conditioning and pre-drying the biomass (WO 2003/002 690), the hydrothermal carbonization allows the use of wet biomass as raw material, which represents significant savings in operating costs.

Already in 1943, ES 0160612, described a process of carbonization of biomass in the presence of water, in which the biomass, in this case vegetable waste, was placed in a pre-moistened retorts to which superheated steam was injected until reaching temperatures from 180° C. to 220° C. and pressures from 2 to 10 atm. This process dragged on for about 6 to 20 h up to reach the desired conditions of the final product, its main drawback compared to the present invention being the need for it to operate intermittently.

Years later, in U.S. Pat. No. 4,579,562, a new alternative for carrying out the process of carbonization was presented. In this case, the reaction was continuously carried out in a countercurrent flow reactor; in which the solid came into contact with a liquid at temperatures of 204° C. to 343° C. and pressures high enough to prevent the water from boiling.

Unlike the previous system, in JP 2002/059118, biomass is fed into an autoclave where it is subjected to a treatment at high pressures and temperatures, in the presence of water. After the time required for processing has elapsed, the reactor is cooled and opened for extracting the final product of the reaction.

A common feature of all the methods described above is the importance of working under stable and adequate operation conditions.

Therefore, the present invention is mainly directed to a new pressure and temperature control system for one or a set of chemical reactors largely based on a set of equipments on which the process water itself is used for refrigerating the system. Using this system, of great simplicity, it is possible to control the temperature and pressure of the reactor or reactors without the need of using movable devices or heat exchange surfaces therein, which often have the disadvantage of accumulating unwanted deposits on their surface after certain period of operation. The removal of such movable devices will mean significant savings in terms of cost and time required for cleaning and maintenance thereof.

Additionally, the fact of having heat exchange surfaces inside the reactor or reactors of the system involves the generation of temperature gradients between the coolant and the reaction medium, thereby hindering the temperature control process. The present invention allows solving this problem, thanks to the use of the process water itself for reducing the temperature of the reactor or reactors, thus maintaining uniform the temperature inside aqueous solution. In addition, by offering the possibility of using the latent heat of water evaporation, it allows achieving a high refrigeration capacity of the system, as well as a good stability of the required pressure and temperature conditions.

Moreover, an additional advantage of the present invention is the offered possibility of recovering some of the enthalpy of the steam generated during the reaction, preferably by using a steam turbine and/or by its condensation into a heat exchanger, thus being able to take the heat released into said equipment for use in other heating processes or applications.

Also, an additional some of the steam generated may be used to preheat the raw material fed to the process, both by its direct injection into said raw material, and indirectly through a heat exchanger.

While the control system presented can be applied to various types of reactors and processes, is preferably directed to the HTC process, whether it takes place in continuous-type reactors, such as when conducted in batch-type reactors. It will, therefore, be an object of this invention a pressure and temperature control system particularly suited for use in a HTC process, as well as the use of this system for controlling the pressure and temperature of a HTC process.

DESCRIPTION OF THE INVENTION

The present invention relates to a pressure and temperature control system for of at least one chemical reactor, characterized in that it includes at least the following devices:

a) a deposit with at least one pressure regulation device (hereinafter, pressure regulation deposit);
b) a connecting duct between the chemical reactor or reactors and the pressure regulation deposit;
c) a device for injecting condensates into the reactor or reactors of the system.

With these devices, it is possible to maintain the reactor or set of reactors under suitable pressure and temperature conditions throughout the duration of the process.

The pressure regulation deposit (a) consists of a deposit (1) independent from the reactor comprising at least one gas and/or steam inlet (2) located, preferably, in the bottom of the deposit, submerged in the condensates area. Likewise, the deposit comprises at least one condensates inlet (3) and at least one outlet (4) as well as, located at the top, at least one steam and/or gas outlet (5) with at least one pressure regulation device. This pressure regulation device consists, in its preferred embodiment, of a pressure regulation valve, which is responsible for controlling the reservoir pressure continuously, depending on the value indicated by a pressure sensor located in the very deposit or in its outlet duct. Thus, the pressure in said pressure regulation device will be adjusted according to the pressure required for the process and, in turn, its setpoint value will be adjusted to the value resulting from being at said pressure required for the process, the pressure of the water column corresponding to the condensate level inside the pressure regulation deposit. This setpoint can be adjusted electronically, in the case of including an electronic regulator, or manually, in the case of being a mechanical device.

Additionally, in a preferred embodiment of the deposit, this will be equipped, at the top, with at least one device selected from a group consisting of: an additional pressure regulation valve, a pressure probe, a temperature probe, a level probe, a deaerator, a vacuum breaker and a safety valve, as well as any combination thereof. Similarly, it may have, in the condensates area, an additional temperature probe.

Once the setpoint value of the pressure regulation valve is reached, said valve begins to gradually open letting the steam and/or gases accumulated inside the deposit (1) to pass. In this way, it is always possible to maintain a stable pressure value, said value being within the control range of the regulation valve. Moreover, as a result of the vale opening, there is a pressure gradient produced between the reactor or reactors and the pressure regulation deposit (1), thus encouraging the steam and/or gas flow between these equipments through their connecting duct (13).

After the evacuation of the steam and/or gases from the deposit (1) through its regulation valve, these are then directed to, at least, one vapor recovery equipment, preferably to one or more condensers (6) and (7), which are designed to operate at a temperature sufficiently lower than that of the process. In a preferred embodiment, in which the process is the HTC process, the temperature in the condenser or condensers will be at least 20° C., and preferably 50° C. below the process temperature.

Optionally, prior to the condensation step, it may be used, in turn, at least one steam turbine (8) to take advantage of the enthalpy of the steam and/or gases generated during the electricity generation process. In this case, the operating temperature of the condenser or condensers will be as close as possible to room temperature, thus achieving a better performance of the stem turbine or turbines.

Also, in a preferred embodiment of the invention applied to the HTC process, some of the excess steam generated during the reaction may be used in the initial heating stage of the process. Thus, in a particular embodiment in which the HTC process is intermittently carried out in multiple autoclave type reactors, the steam will be directly and preferably injected into the reactor that is in its initial heating stage. If, otherwise, the process is carried out continuously, the steam may be used for heating the aqueous mixture of biomass fed to the reactor, preferably through a heat exchange surface.

Moreover, during the chemical reaction process, it is possible that other gases in addition to water steam, such as methane and/or $CO_2$ give off the process. Since the condensation temperature of these gases is much lower than the condensation temperature of water steam, an accumulation of these can have negative effects on the functioning of the condenser(s), as well as the heat exchanger(s). Therefore, in order to avoid a possible decrease in the thermal capacity of said equipments, these will be equipped with at least one device for evacuating air and gases.

After the condensation step, the condensate steam is directed to, at least one, pressurized or atmospheric deposit for storing the condensates (9), wherein the condensates are transported and re-injected into the pressure regulation deposit (1) at the time that it reaches the minimum predetermined level of such condensates. On the contrary, in case of overpass its maximum level, it will proceed to evacuate thereof, through a condensate drain valve, until achieve again a value that is within the level range that has been established. In this way, it is always possible to maintain the condensate volume of the deposit between a minimum level and a maximum level approximately between 50 and 90% and, preferably, between 60 and 80% of its total volume.

One of the main objects of the presented pressure regulation deposit (1) will precisely be the pressure control of the reactor or reactors at the installation (10), (11) and (12), wherewith it communicates through the connecting duct (b). This connecting duct (13) will be designed so as to have the sufficient size to evacuate the maximum amount of gases and/or water steam from the top of the reactor or reactors to the pressure regulation deposit (1).

In turn, in a particular embodiment of the invention, said connecting duct (13) will be additionally equipped with at least one cut-off valve designed to slowly open once the minimum pressure required for the process has been reached. Said valve can imply a considerable saving of the energy used by the system by allowing the use of some of the generated steam in order to facilitate the starting of the process performed in a single reaction equipment.

In the case of a set of reactors connected to a single pressure regulation deposit (1), it will be necessary to have a cut-off valve between each reactor and said regulation deposit (1), so as to allow the individual disconnection of each of them.

Once the saturated steam and/or gas flow from the reactor or reactors reaches the pressure regulation deposit (1) and because the opening of the inlet duct towards the deposit is preferably submerged in the condensates area, a heating effect of said condensates is caused as long as these are at a lower temperature than that of the inlet steam and/or gases, and there is therefore a temperature gradient between both phases. In this way, inside the deposit (1) an approximately stable temperature, as close as possible to the process temperature conditions, is achieved.

In the particular case of the HTC process, the temperature will be between 170° C. and 230° C., preferably between 179.8 and 219.6° C., and more preferably between 191.6 and 209.8° C., thus encouraging the carbonization continuity by avoiding unwanted interruptions in the process resulting from the need for setting the lower temperature of the water injected into the reactor.

In turn, the injection into the reactor or reactors of the condensates coming from the regulation deposit (1) is carried out through the device for injecting condensates (c), located around the side wall and bottom of each reactor. This injection device may comprise one or more injection openings, through which the condensates coming from the pressure regulation deposit (1) are introduced into different parts of the equipment.

The amount of condensates fed to the reactor or reactors will be a function of the level control the reactor(s) itself, being at least that necessary to maintain a stable amount of aqueous solution therein.

Also, in a preferred embodiment of the invention, the reactor or reactors will be further equipped, at their top, with at least one device selected from a group consisting of: a safety valve, a pressure probe, a temperature probe, a filling level probe, an air and gas vent and a vacuum breaker, as well as any combination thereof. Similarly, in order to control the temperature of the process and avoid unwanted heat losses into the atmosphere, the reactor or set of reactors (10), (11) and (12), the connecting duct (13) and the pressure regulation deposit (1) will be thermally insulated from the outside, preferably by using rock wool and aluminum sheet.

Finally, on the side and/or bottom of the reactor or reactors a device for injecting steam (14), which consists of one or more inlets for performing the injection of steam into the reactor or reactors, preferably, during their cold start, are arranged. The steam used may come either from an external source, preferably a steam boiler (15), or from the very pressure regulation deposit (1) in case the system is operating under nominal operating conditions, and the deposit is being fed by other reactors so that its pressure is higher than that of reactor in start phase. In the particular case of the HTC process, the amount injected will be that necessary to reach a temperature of at least 170° C., preferably 180° C., and more preferably at least 195° C.

LIST OF REFERENCES USED IN FIGURES

Figure 1:
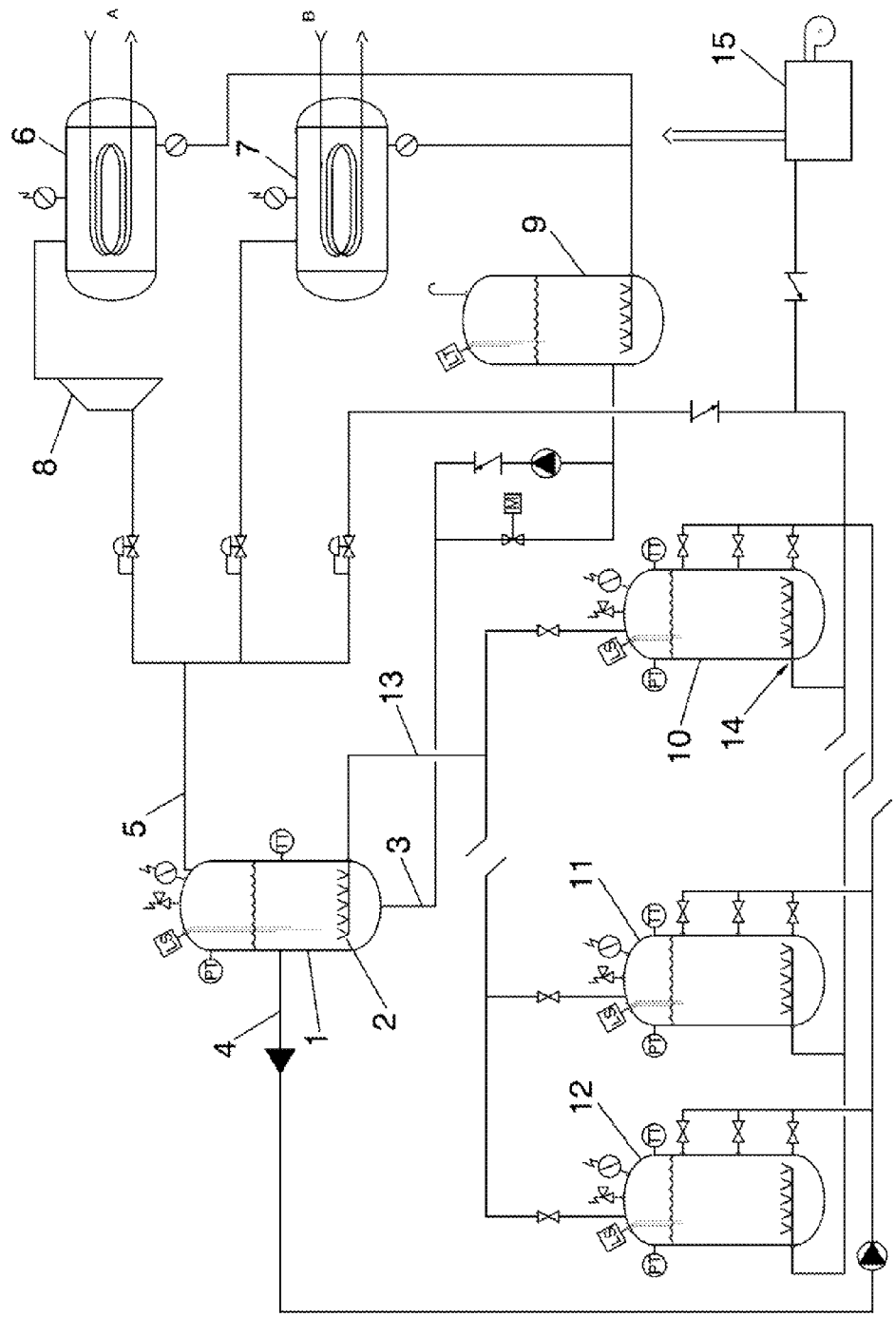
FIG. 1 shows a diagram of the pressure control system applied to a set of reactors.
Figure 2:
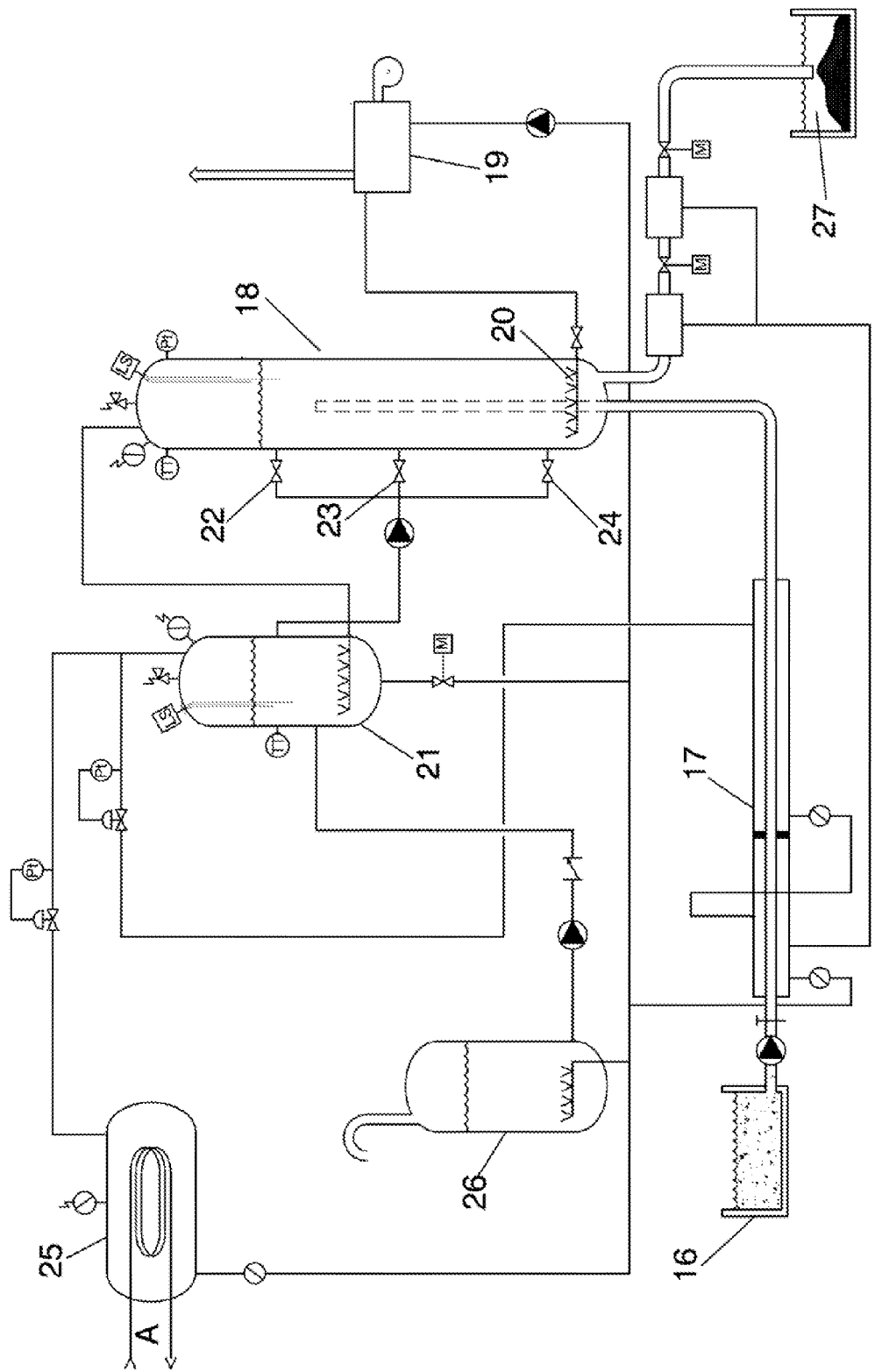
FIG. 2 shows the application of the temperature and pressure control system for a continuously operating reactor of the HTC process.

FIG. 1
1. Pressure regulation deposit
2. Gas and/or steam inlet
3. Condensate inlet
4. Condensate outlet
5. Steam and/or gas outlet
6. Condenser 1
7. Condenser 2
8. Steam turbine
9. Deposit for storing the condensates 1
10. Reactor 1
11. Reactor 2
12. Reactor 3
13. Connecting duct between the reactor and the pressure regulation device
14. Device for injecting steam
15. Steam boiler de vapor 1
Currents
A. Coolant fluid FIG. 2
16. Aqueous mixture of biomass and catalyst
17. Preheating equipment
18. Vertical reactor
19. Steam boiler 2
20. Steam injector
21. Pressure regulation deposit 2
22. Condensate injector 1
23. Condensate injector 2
24. Condensate injector 3
25. Condenser 3
26. Deposit for storing the condensates 2
27. Final product Preferred Embodiment Of The Invention The description of a preferred embodiment of the invention particularly directed to the control of operating conditions of a HTC process is now detailed described referring to the numbering adopted in FIG. 2.

In the case of applying the pressure and temperature control system described above to a HTC process, said system will additionally comprise at least one of the following equipments:

a pressurization equipment;
a preheating equipment;
a vertical reactor with flow reversal;
a cooling equipment, and
a depressurization equipment The pressurization equipment consists of a device for compressing the mixture of, at least, biomass, catalyst and process water (16), until reaching the pressure required to, firstly, overcome the pressure inside the reactor and the counter pressure created within the supply pipe to the reactor, and secondly, to prevent the return of the material and possible leakage of process water. This equipment preferably consists of, at least, one gate valve and/or a pressure pump and, more preferably at least one piston or diaphragm pump designed to work both continuous and at short time intervals, thereby allowing continuously performing the carbonization operation.

In turn, the preheating equipment (17) consists of at least one heat exchanger, preferably a pressurized double-walled tube, through inside of which the mixture of, at least, biomass, catalyst and process water is transported, and through the outside, the fluid for supplying heat. This fluid will preferably consist of in hot oil, water or water steam, more preferably, the water steam.

Optionally, such as noted above, there is the possibility of directly injecting steam into the aqueous mixture of biomass and catalyst at a pressure higher than that of the preheating tube itself and therefore, higher than the process pressure. The source of said steam can be either an external source, preferably a boiler (19), as the steam from the process itself fed through a compressor.

Moreover, the transport speed of the mixture of biomass and process water along the preheating tube is controlled by the pressurization equipment and its diameter is designed such that the residence time of the mixture therein is about 20 to 60 minutes, preferably from 30 to 40 minutes, and the resulting temperature at its outlet, increases to at least 170° C., preferably above 175° C., and more preferably over 180° C.

With regard to the reactor of the system (18), said reactor preferably consists of a pressurized deposit in which some or all of the chemical process of carbonization takes place. Said reactor is characterized by allowing a continuous, or at regular intervals, supply of biomass, as well as a continuous, or at regular intervals, extraction of the extraction matter without changing, on the other hand, the temperature or pressure therein. In turn, the reactor consists of at least four different areas: an riser tube, a gas area, a polymerization area and a maturation area:

i. The riser tube is an extension of the preheating tube and occupies the central area of the reactor from the bottom up to approximately a 50 to 80% of the reactor height, preferably from 60 to 70%.
ii. In turn, the reactor has a tube at the top, which allows being communicated with the pressure regulation deposit (21), deposit by which the reactor pressure is controlled. Through this connection tube the evacuation of the steam generated by the exothermic nature of the HTC process, along with air into the process water or the gases given off by the decomposition of biomass is achieved.
iii. Additionally, the reactor can be equipped, at the top, with at least one device selected from a group consisting of: a safety valve, a pressure probe, a temperature probe, a filling level probe, an air and gas vent and a vacuum breaker, as well as any combination thereof.
iv. Around the opening of the riser tube and on the upper half of the reactor, is the polymerization area. The residence time of biomass in this area only depends on its density and thermal activity and, therefore, the state of progress of the HTC process. In this way, some variations for different compounds of the mixture, which, after this time, fall into the maturation area, is allowed.
v. The maturation zone is located at the bottom of the cylindrical reactor, following the polymerization area and around the riser tube. Optionally, it could also be located in outer areas of the reactor, in case the same conditions of thermal stability as in said equipment are provided.
vi. In turn, on the side and bottom of the reactor and riser tube, one or more inlets for performing the injection of steam (20) during its cold start or in case of possible thermal deficiencies therein are provided.
vii. One or more inlets for the injection of condensates are also distributed on the sidewall of the reactor. The supply of these is intended to homogenize the reactor temperature, as well as compensate for the water evaporated due to the exothermic nature of the HTC process.
viii. Similarly, to control the operating temperature and prevent uncontrolled heat losses into the atmosphere, the reactor will be thermally insulated, preferably by using rock wool and external finishing of aluminum sheet.

After the reactor the cooling equipments is located, which preferably comprises one or more parallel tubes containing the hot and pressurized mixture from the reactor therein and, outside, a coolant fluid that can be hot oil or pressurized water, preferably hot oil, which cools said mixture up to the temperature set as a target.

Finally, the depressurization equipment is situated. This equipment preferably includes two gates or valves arranged in series, which must be capable of operating under the conditions in which the process takes place. Additionally, a "flash" deposit may be located in the middle of the two gates or valves in order to better absorb the shocks of their openings.

It is also an object of this invention the use of a pressure and temperature control system, as previously described, for the control of a reactor in which a HTC process is performed.

Finally, it will be an additional object of the invention, a pressure and temperature control method for a reactor in which a HTC process is performed, characterized in that it comprises at least the following steps:

a) pressurizing an aqueous mixture of biomass and catalyst to a pressure of at least 10 bar;
b) preheating the aqueous mixture of biomass and catalyst in order to reach a temperature of between 170° C. to 210° C.;
c) feeding the aqueous mixture of biomass and catalyst to a vertical reverse flow reactor (20) in which the carbonization process takes place;
d) cooling the mixture of carbonized biomass together with, at least, process water in a cooling tube up to values below the evaporation temperature under atmospheric pressure, i.e. below 100° C.;
e) depressurizing and extracting the aqueous mixture of the carbonized biomass.

Additionally, this method may also include a step for pretreating the biomass before being fed to the system, in order to achieve appropriate conditions for processing thereof in addition to facilitate the subsequent process of carbonization. Namely, a preferred embodiment of this additional pretreating phase includes at least one step for milling and one step for washing the biomass:

a) In the first step, the biomass will be milled until achieving a maximum particle size that allows its subsequent pass through the pressurization equipment. In the case of being, for example, biomass coming from agricultural or forestry operations, the final size will be less than 30 cm, and preferably less than 15 cm;
b) then, in order to eliminate contaminants in the biomass, such as sand, stone, glass, metals or other elements of higher density than water, the biomass will be introduced in a water washing pool, or a mixture of acid and water, for a time from 5 to 120 minutes, preferably 10 to 30 minutes. By this washing, contaminants will be separated from the biomass and descend to the bottom of the pool, while biomass will be floating on the surface until increasing its density above that of the water due to the absorption thereof. Other contaminants not qualified for the HTC process, such as plastics, and also with a tendency of floating on water, should be eliminated by other processes of selection and separation, both naturally and through centrifugal machines or pressurized air systems.

After this preliminary pretreating step, the biomass will be stored in a hopper or container from which will be fed to the HTC process. One advantage of this process is that it is applicable to any type of biomass, which may include, for example, forest, agricultural, landscaping residues, sewage sludge, algae, and residues from agricultural industries, urban waste, etc. In the case of the biomass consisting of sewage sludge or pre-selected household wastes, this pretreating step is not necessary, whereby the biomass can be fed directly to the HTC process.

Said process begins with the mixture of the biomass selected as raw material with a certain amount of process water. Said mixture will also contain at least one mean for accelerating the chemical reaction, which can be an organic or inorganic catalyst, preferably an acid, and most preferably citric acid or sulfuric acid. In this case, the acid is added in a sufficient amount to obtain a pH within the reactor of between 4.5 and 6.5, preferably between 5 and 6.

This aqueous mixture of biomass and catalyst is then subjected to a pressurization step up to a pressure that is, at least, the one required to be inserted into the preheating tube (17) and, from there, to the reactor. This pressure will be higher than 10 bars and, preferably, higher than 13 bars. Then, the aqueous mixture of biomass and the catalyst is preheated, in order to reach the starting temperature of the HTC process in its monomerization stage. This preheating step can take place in a heat exchanger, preferably a preheating tube (17), in which the mixture will be heated through the heat input received through the pipe walls, reaching temperatures from 170° C. to 210° C., more preferably from 180° C. to 200° C. Additionally, as an alternative or complement to the indirect heat exchange carried out in the preheating tube, there is the possibility of directly injecting steam into the aqueous mixture of biomass and catalyst at a pressure higher than that of the preheating tube itself, until reaching the temperatures above mentioned. Once said temperatures are reached, the aqueous mixture of biomass and catalyst is fed to a vertical reverse flow reactor (20) through an riser tube, in which tube the monomerization or hydrolysis of biomass is initiated. At the same time, the formation of oils begins, as well as the release of gases, such as methane or C02, coming from the natural decomposition of the biomass. These gases then rise through the interior of the riser tube until being accumulated at the top of the reactor, from where are evacuated, along with the saturated vapor, towards the pressure control deposit. Under normal conditions, the reactor is fed with the mixture of biomass and process water until reaching 60% to 90%, preferably 70% to 80% of the reactor volume. Although the density of biomass can vary and be lower or higher than that of the water, once the monomerization step has begun, the components derived from thereof tend to rise and float on the surface. This effect allows said compounds remaining close to the flotation line, once they had reached the opening of the riser tube.

Thus, under normal conditions, at the outlet of this duct the HTC process has already begun, and the resulting components of the first monomerization stage enter a second polymerization step. In this new stage, oils and other components that had been formed during the monomerization, polymerize and form a kind of resin or coal previous state. Depending on the type of biomass and process conditions, this stage lasts from 1 to 6 hours, preferably between 2 and 4 hours.

Moreover, by being a process of exothermic nature, it is important to control the temperature and pressure conditions, preferably within the limits of the process established by the Max Planck Institute. Specifically, the preferred temperature range has to be between 170° C. and 230° C., preferably between 179.9 and 219.6° C., and more preferably between 191.6 and 209.8° C., while for the pressure, the preferred range has to be 8 to 28 bars of absolute pressure, preferably from 10 to 23 bars, and more preferably between 13 and 19 bars. These values will be a function of both the type of biomass, and the product desired to be obtained.

The reason why it is necessary to achieve a good control of process conditions is to avoid excessive operating temperatures at which chemical processes in addition to the HTC may occur, which can result, for example, in an excess of C02, which, if not evacuated properly, could in turn cause an unwanted increase in the pressure inside the reactor.

As the HTC process progresses, the density of the formed solid compounds increases while, at the same time, the thermal activity is decreasing. As a result of these effects a downfall of the compounds within the process water to the maturation area is caused.

At the beginning of this third stage, the main carbon formations have already been developed, but still H20 molecules can be detached from the formed carbon structures. After about 2 to 12 hours, depending on the type of biomass and process conditions, the thermal activity will have dropped to almost zero.

After the carbonization process the mixture of carbonized biomass together with, at least, process water is directed to a cooling tube, wherein its temperature is reduced to levels below the evaporation temperature under atmospheric pressure, i.e. less than 100° C. In this way, potential instant evaporates in the depressurization equipment, located below, through which the aqueous mixture of carbonized biomass is drawn in a controlled manner, are prevented. After some time, the solid particles of said mixture will be deposited in the bottom of the output container or will either be separated from the liquid phase by a mechanical separation operation, preferably by centrifugation or filtration, being used, depending on its purity, as solid fuel or raw materials for other processes.

In a particular embodiment of the invention, the coal will be used as solid fuel, preferably, compressed into pellets or briquettes. Alternatively, the coal obtained may be used as raw materials for other industrial processes, preferably for liquid hydrocarbon fuel processing. Finally, there is also the possibility of cutting the time needed for maturation. In this case, the final product is a kind of mob that can be used as fertilizer.

Finally, in a preferred embodiment of the invention, some of the heat released from the cooling stage of the mixture of carbonized biomass with, at least, process water, resulting from the hydrothermal carbonization process can be recovered in, at least one of the system steps that require heat, preferably in the step for preheating the mixture of biomass, catalyst and process water fed to the system, which step preferably takes place in the preheating equipment (17) previously described.

EXAMPLE 1

Next, the application the temperature and pressure control system to the HTC process described above is presented by way of example and in a not limitative manner, according to the numbering adopted in the figures:

In this way, an aqueous mixture of biomass, to which a catalyst such as citric acid or sulfuric acid is added, adjusting its concentration to achieve a pH value of 5.5 (16) is fed into a vertical reactor of continuous operation (18), once it has been preheated in the preheating tube (17) to a temperature of 180° C.

Then, during the cold start of the process, a certain amount of steam at a temperature of 195° C., is injected into the reactor through the injection openings (20). Once the process temperature and pressure are reached, approximately 191° C. and 13 bars of pressure, the carbonization enters its monomerization and polymerization stages, and then initiates a step for releasing energy to the reaction medium due to the exothermic nature of the process itself. As a result of heat generation at the molecular level of the biomass, and because of its direct contact with the aqueous environment, some of the water begins to evaporate, climbing inside the reactor until being accumulated on top of thereof. From there, it will be transported to the pressure regulation deposit (21), along with other gases released during the process, including for example, methane, CO2 or air.

Thus, as the process progresses, the generated water steam is accumulating, along with other gases, on the top of the regulation deposit (21). As a result, the pressure therein is gradually increasing until reaching a value of about 13 bars, equivalent to the setpoint value for opening the control valve provided for the deposit (21).

After opening the valve, the gases, along with water steam, are evacuated and transferred to the condensing equipment (25), in which are cooled to a temperature of about 90° C. Those gases that do not condense at this temperature are evacuated into the environment by means of the air and gas removing device, which is provided in said equipment.

In turn, some of the generated steam, from 20% to 50% depending on the dilution of the biomass with water, is used in the preheating tube (17) to preheat the aqueous mixture of biomass fed to the reactor (18).

After the condensation step, the condensates are sent to the open storing deposit (26), occupying from a 20 to 90% of its capacity. From there, these will be reinjected to the pressure regulation deposit (21), when a condensate level below 60% of its volume is reached into said equipment.

Moreover, a certain amount of these condensates from the regulation deposit (21) will be fed to the reactor (18), at a temperature of about 190° C., in case said equipment reaches a minimum volume of about 70%. In this way, it is possible to recover some of the water evaporated during the exothermic process of carbonization, while temperature homogenization at different points inside the reactor is achieved.

In turn, through this control system, it is possible to carry out the process continuously and, at the same time, suitable and stable pressure and temperature conditions are achieved to be maintained throughout the operation without needing additional mobile equipments or heat exchange surfaces inside the reactor.

Also, and additionally, this preferred embodiment of the invention will allow recovering some of heat released from the step for cooling the mixture of carbonized biomass with, at least, process water resulting from the carbonization process in the step for preheating the mixture of biomass, catalyst and process water fed to the system, step which is carried out in the preheating equipment (17).

The invention claimed is:

1. A pressure and temperature control system for at least one chemical reactor for a hydrothermal biomass carbonization reaction, said control system comprising, at least, the following devices:
    a) a deposit with a top and a bottom and including at least one pressure regulation device, at least one inlet and at least one outlet for condensates, at least one steam and/or gas inlet located at the bottom of the deposit, and at least one steam and/or gas outlet located at the top of said deposit;
    b) a connecting duct between said deposit and a top of the reactor;
    c) a condensate injecting device for injecting condensates into the reactor.

2. A control system, according to claim 1, further comprising at least one means for recovering the enthalpy from steam and/or gases generated in the reactor.

3. A control system, according to claim 2, wherein the means for recovering the enthalpy from the steam and/or gases generated in the reactor is a turbine.

4. A control system, according to claim 1, further comprising at least one condensate deposit for storing the condensates.

5. A control system, according to claim 1, wherein the deposit (a) further comprises at least one device selected from a group consisting of a pressure regulation valve, a pressure probe, a temperature probe, a level probe, a deaerator, a vacuum breaker and a safety valve, as well as any combination thereof.

6. A control system, according to claim 1, wherein the connecting duct (b) between the reactor and the deposit (a) leads to said deposit below its surface of condensates.

7. A control system, according to claim 1, further comprising, a system for injecting steam into the reactor.

8. A control system, according to claim 1, further comprising, at least one external steam generating device.

9. A control system, according to claim 8, wherein the external steam generating device is a boiler or a steam compressor.

10. A control system, according to claim 1, additionally comprising at least one of the following:
    a) a pressurization equipment;
    b) a preheating equipment;
    c) a vertical reactor with flow reversal;
    d) a cooling equipment, and
    e) a depressurization equipment.

11. a method comprising providing a control system according to claim 1 and operating said control system to control the pressure and temperature of at least one chemical reactor.

12. A pressure and temperature control method, providing the system according to claim 1, and performing in said system the following steps:
    a) pressurizing an aqueous mixture of biomass and catalyst to a pressure of at least 10 bar;
    b) preheating the aqueous mixture of biomass and catalyst to a temperature of between 170° C. to 210° C.;
    c) feeding the aqueous mixture of biomass and catalyst to a vertical reverse flow reactor in which a hydrothermal carbonization reaction takes place resulting in a mixture of carbonized biomass together with, at least, process water;
    d) cooling the mixture of carbonized biomass together with, at least process water in a cooling tube up to values below its evaporation temperature under atmospheric pressure;
    e) depressurizing and extracting the aqueous mixture from the carbonized biomass.

13. A pressure and temperature control method, according to claim 12, further comprising an additional step for pretreating the biomass.

14. A pressure and temperature control method, according to claim 13, wherein said pretreating step comprises, in turn, at least one step for milling and at least one step for washing the biomass.

15. A pressure and temperature control method, according to claim 12, further comprising an additional step for recovering some of the heat released in step (d) for cooling the mixture with carbonized biomass together with, at least, the process water resulting from the hydrothermal carbonization process in step (b) for preheating the aqueous mixture of biomass and catalyst fed to the system.

16. A pressurized vertical reverse flow reactor for carrying out a hydrothermal carbonization reaction resulting in a mixture of carbonized biomass together with, at least, process water, wherein said reactor comprises a riser tube therein, which occupies a central area of the reactor from the bottom up 50 to 80% of the reactor height; as well as at least one steam inlet for injecting steam in a side and a bottom of the reactor and the riser tube, at least one steam evacuation duct at top of the reactor for the evacuation of steam and at least one condensate inlet for injecting condensates.

17. a pressurized vertical reverse flow reactor according to claim 16, wherein said reactor further comprises at least one device selected from a group consisting of a safety valve, a pressure probe, a temperature probe, a filling level probe, an air and gas vent and a vacuum breaker, as well as any combination thereof.

* * * * *